Aug. 13, 1963  H. HOTELLING  3,100,855
TRIMMING CAPACITOR
Filed Nov. 24, 1958  2 Sheets-Sheet 1

INVENTOR.
HARRY HOTELLING
BY
*Charles L. Lombach*
ATTORNEY

Aug. 13, 1963　　　H. HOTELLING　　　3,100,855
TRIMMING CAPACITOR
Filed Nov. 24, 1958　　　　　　　　　　　　2 Sheets-Sheet 2

INVENTOR.
HARRY HOTELLING
BY
*Charles L. Lovercheck*
ATTORNEY

3,100,855
TRIMMING CAPACITOR

Harry Hotelling, Erie, Pa., assignor to Erie Resistor Corporation, Erie, Pa., a corporation of Pennsylvania
Filed Nov. 24, 1958, Ser. No. 775,828
4 Claims. (Cl. 317—249)

This invention relates to electronic components and, more particularly, to capacitors and, especially, capacitors of the type known as trimmer capacitors.

Trimmer capacitors made according to present practice are each made as an individual unit and one or more of the units are attached to a terminal board or other supporting member for attaching to an electronic chassis or the like. These capacitors are usually made up of two electrodes or plates having a dielectric material therebetween. Frequently, these capacitors are made in the form of a hollow cylindrical member made of dielectric material having a cup shaped electrode on each end thereof and having a screw disposed in a threaded hole concentric to the central axis of the cylinder, the screw being electrically connected to one of the cup shaped members and movable in and out of the threaded hole to change the effective distance between the electrodes and, thereby, change the capacitance of the capacitor so that the capacitance thereof can be adjusted between fixed limits.

Present designs of trimmer capacitors have the disadvantage that they must be made of material which can be extruded into long cylindrical rods which can later be machined according to common practice. Many materials which can be extruded have a relatively poor dielectric constant and do not have as good dielectric properties. Many other materials which cannot be extruded but can be molded have excellent dielectric properties. Further, capacitors made according to present designs must have an extremely thin wall thickness between the threaded holes at the center and the outside periphery. For this reason, these capacitors are relatively weak and break easily.

It is, accordingly, an object of the present invention to overcome the disadvantages of previous capacitors and, more particularly, it is an object to provide an improved trimmer capacitor and a plurality of trimmer capacitors wherein the trimmer capacitors are simple in construction, economical to manufacture, and simple and efficient to use.

Another object of the invention is to provide a trimmer capacitor wherein the supporting member for the capacitor is an integral part of the dielectric material of the capacitor itself.

Still another object of the invention is to provide trimmer capacitors made up of a supporting member and electrodes on the supporting member, the supporting member constituting the dielectric members of the capacitors.

A further object of this invention is to provide an improved supporting member for capacitors wherein the capacitors are made up of a supporting member having integral hubs molded thereon with holes extending through the hubs and electrodes on the hubs with a screw extending through the holes to form a trimming adjustment for the capacitors thereof.

A still further object of the invention is to provide an improved trimming capacitor.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
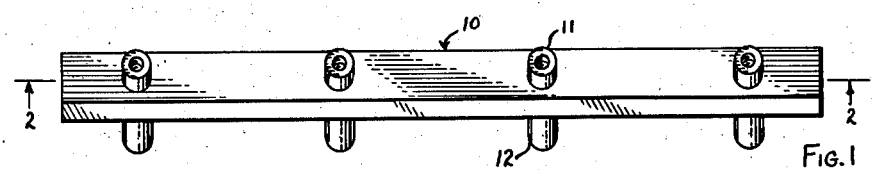
FIG. 1 is an isometric view of capacitors and a supporting member therefor according to the invention.
Figure 2:
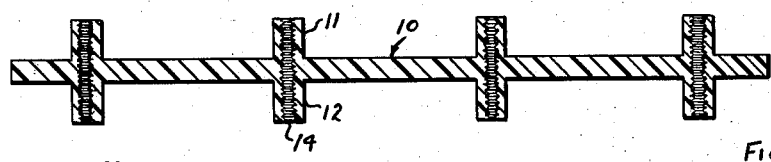
FIG. 2 is a cross sectional view taken on line 2—2 of FIG. 1.

Now with more particular reference to the drawings, a molded capacitor support 10 is shown having hubs 11 and 12 molded thereon. The hubs 11 and 12 are integral parts of the support 10 and extend to opposite directions therefrom. The hubs 11 and 12 are generally cylindrical and have threaded bores 14 extending therethrough and concentric to the hubs 11 and 12. It is obvious that a larger or a smaller number of these hubs could be molded on a given strip to provide the desired number for a given application. The hubs 11 and 12 could be molded in several rows, both laterally and longitudinally, and the material of the support 10 and the hubs 11 and 12 integrally attached thereto could be made of any moldable or formable dielectric material.

Electrodes 15 and 16 are disposed around the outside of the hubs 11 and 12. The electrode 15 can be made of any suitable metallic or electrical conductive material such as beryllium, copper, brass, or the like and a lead wire 17 may be connected at 18 to form an electrical connection therewith. Ends 19 of the electrode 15 engage a screw 20 to form an electrical connection therewith and they allow the screw 20 to be moved inwardly and outwardly in the bore 14 to change the relative effective spacing of the outer periphery of the screw 20 to the inner periphery of the electrode 16, thereby varying the capacitance thereof. The bore 14 may be a plain unthreaded hole and the screw 20 could have only a threaded portion. This is an advantage because by leaving off the threads, the area of the unthreaded part of the screw at a constant distance from the terminal on the opposite side of the hub is greater than with a corresponding threaded screw.

The electrode 16 may be in the form of a cylindrical cup pressed onto the hub 12 or it could be in the form of silver material or other conductive coating material painted thereon or any other electrical conducting material painted or otherwise disposed on the hub 12. A wire 21 is electrically connected to the electrode 16 at 22 and forms electrical contact therewith.

It will be apparent that the capacitance of the capacitors shown in the support 10 can be changed by adjusting the screw 20 and that the support 10 itself can be supported on the chassis of an electronic circuit or the support 10 can be used as a base or chassis for supporting other electrical components. It can also be used as a base for a printed circuit.

In the embodiment of the invention shown in FIGS. 4, 5, 6, and 9, a support 110 is shown having blind holes 114 formed therein. The blind holes 114 receive the silver or like conducting material forming an electrode 116 which may be painted on the bottom half of the hole 114 and on top of the electrode 116 is supported a disk of dielectric material such as Teflon tape indicated at 111. The Teflon tape may be .001 inch thick if desired. On top of the Teflon tape is supported a handle 122 which has attached to the lower end a half circle disk shaped member 123. The handle 122 may have a screw driver slot therein so that it can be adjusted. On top of the half circle disk 123 is supported a disk 120 of a material similar to that of which the support 110 is made. The disk 120 may be cemented or pressed in place. The handle 122 has spaced peripheral grooves therein as shown which receive a washer 126 and thereby hold the handle 122 in alignment on the disk 120. The washer 126 may be made of metallic material and has a lead wire 125 attached thereto. Therefore, the washer 126, the lead wire 125, and the handle 122 form one terminal of the capacitor.

The Teflon tape material 111 acts as a dielectric, the electrode 116 of silver acts as one plate of a condenser, and the semi-circular disk member 123 as another plate of the condenser. A lead wire 121 is electrically connected to the electrode 116 and extends through a small hole in the opposite side of the support 110. Therefore, to adjust the condenser, it is necessary to rotate the handle 122 to bring a greater area of the disk 123 closer to the electrode 116.

Figure 7:
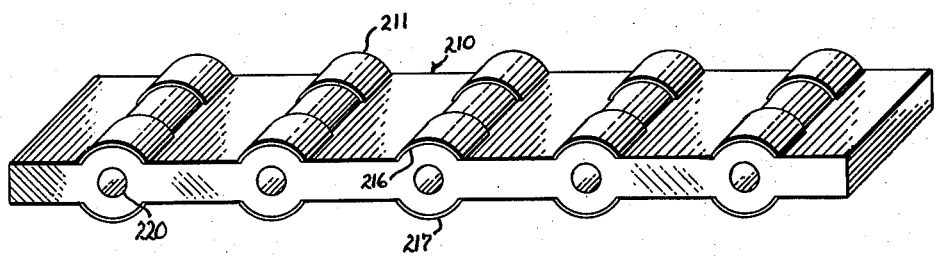
FIG. 7 is an isometric view of another embodiment of the invention.

In the embodiment of the invention shown in FIG. 7, a support 210 similar to the support 10 in FIG. 1 is shown. In this embodiment, spaced bosses 211 are in the form of partial cylindrical portions extending laterally from opposite sides of the panel or support 210. Concentric to the bosses 211 are bores 220 for receiving threaded screws similar to the screws 20 in FIG. 1. On the outer periphery of the bosses 211 are formed electrodes 216 and 217 which may be painted thereon by means of metallic paint. The painted electrodes 216 and 217 are generally concentric to the screws in the bores 220 and, therefore, as the screws are moved in and out of the bores 220, they effectively adjust the value of capacitance of the capacitors formed by the electrodes 216 and 217 and the dielectric made of the support 210.

Figure 8:
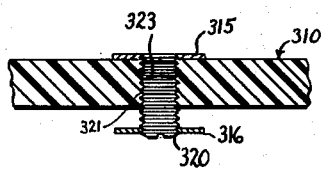
FIG. 8 is a cross sectional view of still another embodiment of the invention.
Figure 9:
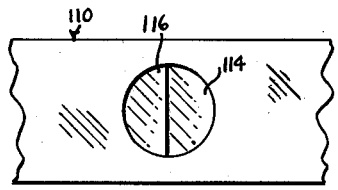
FIG. 9 is a top view of the embodiment of the invention shown in FIG. 4.
Figure 4:
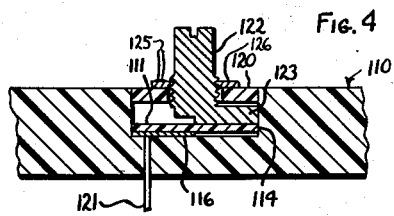
FIG. 4 is a cross sectional view of another embodiment of the invention.
Figure 5:
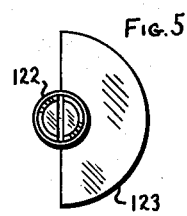
FIG. 5 is a top view of the device shown in FIG. 4.
Figure 6:
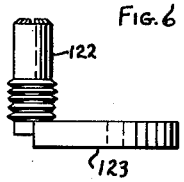
FIG. 6 is a side view of the device shown in FIGS. 4 and 5.

The embodiment of the invention disclosed in FIG. 8 shows a support 310 having electrodes 315 and 316 supported on each opposite side thereof. A screw 320 is disposed in a threaded hole 321 and adjustable inwardly and outwardly thereof to bring its end 323 nearer and further away from electrode 315. The electrodes 315 and 316 may be in the form of metallic disks. The disk 315 may be attached to the panel or support 310 by cementing or otherwise or it could be painted thereon with metallic paint, silver, or other suitable material. The disk 316 may be supported on the screw 320.

Figure 10:
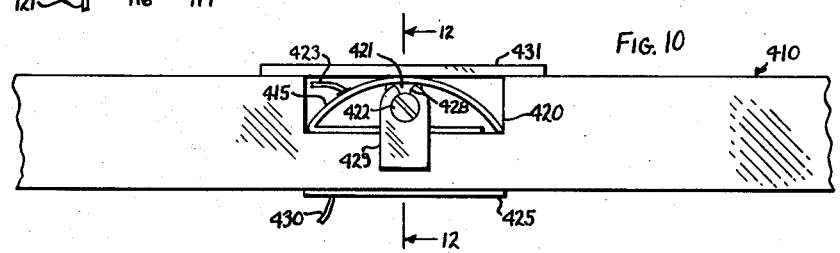
FIG. 10 is a front view of another embodiment of the invention with the device shown in FIG. 5 removed.
Figure 11:
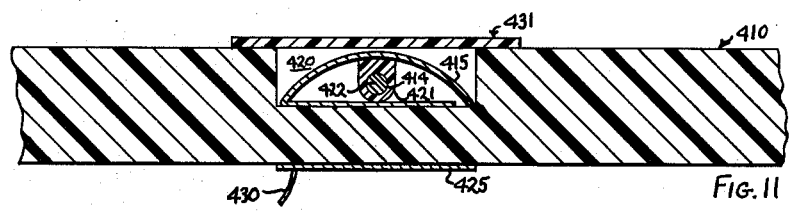
FIG. 11 is a cross sectional view taken on line 11—11 of FIG. 12.
Figure 12:
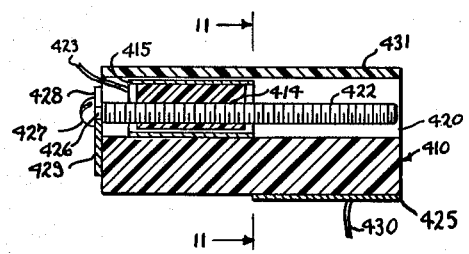
FIG. 12 is a cross sectional view taken on line 12—12 of FIG. 10.

In the embodiment of the invention shown in FIGS. 10, 11, and 12, a capacitor is shown made of a support 410 made of molded material having a good dielectric constant having spaced slots 420 formed therein, only one of which is shown. The spaced slots 420 have silver 425 or other conductive material painted on the bottoms thereof or are otherwise coated over a partial distance to form terminals. A bent spring 415 is supported in the slot 420 with its edges bent downwardly to the bottom of the slot 420. Attached to the upward inner peripheral surface of the spring 415 is a lug 421 which may be glued thereto and which has a threaded bore 414 which threadably engages an adjusting screw 422. The screw 422 has a peripheral groove 426 which forms a reduced size portion just behind a screw head 427. The groove 426 snaps into position in a slot 428 of a clip 429. The clip 429 is cemented to the side of the support 410. Therefore, by turning the screw 422 clockwise or counterclockwise to move the spring 415 inwardly or outwardly, the effective spacing of the lug 421 and the electrode of silver 425 is changed and the effective capacitance of the capacitor is thereby changed.

A lead wire 430 is electrically connected to the electrode 425. Cemented over the entire slot 420 is a strip of material made up of the same material as the support 410. The lead wire 430 electrically connected to the electrode 425 forms the other terminal of the capacitor.

Figure 3:
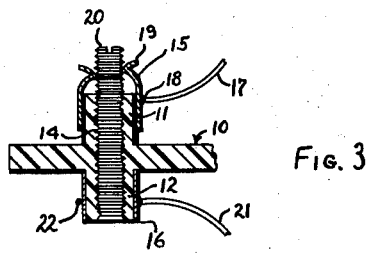
FIG. 3 is an enlarged cross sectional view of the invention shown in FIGS. 1 and 2 showing one capacitor thereof with the support therefor broken away.
Figure 13:
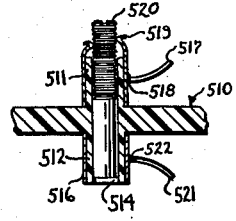
FIG. 13 is a view of another embodiment of the invention.

The embodiment of the invention shown in FIG. 13 is similar to that shown in FIG. 3. In FIG. 13, a screw 520 has a threaded portion which engages ends 519 of electrodes 518. The screw 520 has an unthreaded portion 514 which is snugly and slidably received in the bore in bosses 511 and 512. A support 510 is made of non-metallic dielectric material and has the bosses 511 and 512 molded integral therewith. Leads 517 and 521 are attached to the electrodes 516 and 518 by soldering 522 or the like. This has the advantage that some materials can be used which can be molded but not threaded. Further, the capacitance can be varied in a smoother manner.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a support and a plurality of capacitors, said support comprising a flat plate like member, integral hub members formed on each side of said plate like member, said support and said hub members being made of dielectric material, each said hub member on one side of said support being disposed opposite a said hub member on the opposite side of said support, a hole through each said hub member concentric thereto and extending through a said hub member on the opposite side thereof, a first electrode on each said hub member on one side of said support, a second electrode on each said hub member on the opposite side of said support, and a metallic member extending through each said hole and electrically connected to one said electrode and movable toward another said electrode with the dielectric material of said hub member between said metallic member and one said electrode to vary the capacitance thereof.

2. The combination recited in claim 1 wherein each said electrode comprises a metallic material disposed around the outer surface of one said hub member.

3. The combination recited in claim 1 wherein said hub members each have a smooth unthreaded hole therethrough and said metallic member comprises a cylindrical member having a threaded portion engaging said one electrode and a smooth unthreaded portion extending into said hole in each said hub member.

4. In combination, a support and a plurality of capacitors, said support comprising a flat plate like member, integral hub members formed on one side of said plate like member, said support and said hub members being made of dielectric material, a hole through each said hub member concentric thereto and extending through a said hub member and through said plate like member on the opposite side thereof, a first electrode on each said hub member on one side of said support, a second electrode on the opposite side of said support opposite each said first electrode, and a metallic member extending through each said hole and electrically connected to one said electrode and movable toward another said electrode with the dielectric material of each said hub member between said metallic member and one said electrode to vary the capacitance thereof.

References Cited in the file of this patent

UNITED STATES PATENTS

| | | |
|---|---|---|
| 1,999,137 | Flewelling | Apr. 23, 1935 |
| 2,109,266 | Franklin | Feb. 22, 1938 |
| 2,137,435 | Yolles | Nov. 22, 1938 |
| 2,370,722 | Ehlers | Mar. 6, 1945 |
| 2,474,988 | Sargrove | July 5, 1949 |
| 2,503,084 | White | Apr. 4, 1950 |
| 2,595,194 | Heibel | Apr. 29, 1952 |
| 2,827,601 | Gamzon | Mar. 18, 1958 |
| 2,866,141 | Frank | Dec. 23, 1958 |
| 2,910,635 | Abrams | Oct. 27, 1959 |

FOREIGN PATENTS

| | | |
|---|---|---|
| 628,922 | Great Britain | Sept. 7, 1949 |